(12) United States Patent
Bitterli et al.

(10) Patent No.: US 12,354,217 B2
(45) Date of Patent: Jul. 8, 2025

(54) TECHNIQUES FOR RENDERING MEDIA USING POSITION-FREE PATH INTEGRALS

(71) Applicant: NVIDIA CORPORATION, Santa Clara, CA (US)

(72) Inventors: Benedikt Bitterli, Kirkland, WA (US); Eugene D'eon, Karori (NZ)

(73) Assignee: NVIDIA CORPORATION, Santa Clara, CA (US)

( * ) Notice: Subject to any disclaimer, the term of this patent is extended or adjusted under 35 U.S.C. 154(b) by 170 days.

(21) Appl. No.: 18/152,111

(22) Filed: Jan. 9, 2023

(65) Prior Publication Data

US 2023/0343024 A1 Oct. 26, 2023

Related U.S. Application Data

(60) Provisional application No. 63/334,607, filed on Apr. 25, 2022.

(51) Int. Cl.
*G06T 15/50* (2011.01)
*G06T 15/60* (2006.01)

(52) U.S. Cl.
CPC ............ *G06T 15/506* (2013.01); *G06T 15/60* (2013.01)

(58) Field of Classification Search
CPC ............................. G06T 15/506; G06T 15/60
See application file for complete search history.

(56) References Cited

U.S. PATENT DOCUMENTS

| | | | | |
|---|---|---|---|---|
| 10,210,414 | B2* | 2/2019 | Ohira | G06V 10/243 |
| 2006/0244907 | A1* | 11/2006 | Simmons | G02B 27/46 |
| | | | | 351/159.26 |
| 2014/0204087 | A1* | 7/2014 | Habel | G06T 15/506 |
| | | | | 345/426 |
| 2019/0266788 | A1* | 8/2019 | Huynh-Thu | G06F 30/10 |

OTHER PUBLICATIONS

Amster et al., "Euripus-3 And Daedalus-Monte Carlo Density Codes for the IBM-704", Physics and Mathematics, Feb. 1960, 98 pages.
Amster et al., "Spatial-Distribution Functions for Calculating Neutron Densities by Monte Carlo", Nuclear Science and Engineering, https://doi.org/10.13182/NSE64-A19274, vol. 20, 1964, pp. 53-59.
Berger et al., "Reflection and Transmission of Gamma Radiation by Barriers: Semianalytic Monte Carlo Calculation", Journal of Research of the National Bureau of Standards, vol. 56, No. 2, Feb. 1956, pp. 89-98.

(Continued)

*Primary Examiner* — Ming Wu
(74) *Attorney, Agent, or Firm* — Artegis Law Group, LLP

(57) ABSTRACT

One embodiment of a method for rendering one or more graphics images includes sampling one or more directions of light passing through a medium, computing one or more parameters associated with one or more position distributions based on the one or more directions of light, computing a brightness in a direction at which the light exits the medium based on the one or more parameters associated with the one or more position distributions and the direction at which the light exits the medium, and rendering the one or more graphics images based on the brightness in the direction at which the light exits the medium.

20 Claims, 9 Drawing Sheets

(56) References Cited

OTHER PUBLICATIONS

Bitterli et al., "Tungsten Renderer", Retrieved from https://github.com/tunabrain/tungsten/, 2018, 6 pages.

Blinn, James F., "Light Reflection Functions for Simulation of Clouds and Dusty Surfaces", Computer Graphics (Proceedings of SIGGRAPH), vol. 16, No. 3, Jul. 1982, pp. 21-29.

Chermain et al., "Glint Rendering based on a Multiple-Scattering Patch BRDF", Eurographics Symposium on Rendering, DOI:10.1111/cgf.13767, vol. 38, No. 4, 2019, pp. 27-37.

Chilton et al., "Imaging Properties of Light Scattered by the Sea", JOSA, https://doi.org/10.1364/JOSA.59.000891, vol. 59, No. 8, Part 1, Aug. 1969, pp. 891-898.

Dupuy et al., "Additional Progress Towards the Unification of Microfacet and Microflake Theories", Eurographics Association, 2016, 9 pages.

Donner et al., "Light Diffusion in Multi-Layered Translucent Materials", ACM Transactions on Graphics, vol. 24, No. 3, Jul. 2005, pp. 1032-1039.

Drawbaugh, D. W., "On the solution of transport problems by conditional Monte Carlo", Nuclear Science and Engineering, DOI: 10.13182/NSE61-A15603, vol. 9, 1961, pp. 185-197.

Dwivedi, S. R., "A New Importance Biasing Scheme for Deep-Penetration Monte Carlo", Annals of Nuclear Energy vol. 9, 1982, pp. 359-368.

Farrell et al., "A Diffusion Theory Model of Spatially Resolved, Steady-State Diffuse Reflectance for the Noninvasive Determination of Tissue Optical Properties in Vivo", Medical Physics, vol. 19, No. 4, 1992, pp. 879-888.

Gamboa et al., "An Efficient Transport Estimator for Complex Layered Materials", Eurographics, DOI: 10.1111/cgf.13936, vol. 39, No. 2, 2020, pp. 363-371.

Guo et al., "Position-Free Monte Carlo Simulation for Arbitrary Layered BSDFs", ACM Transactions on Graphics, https://doi.org/10.1145/3272127.3275053, vol. 37, No. 6, Article 279, Nov. 2018, pp. 279:1-279:14.

Heitz et al., "Multiple-Scattering Microfacet BSDFs with the Smith Model", ACM Transactions on Graphics, http://doi.acm.org/10.1145/2897824.2925943, vol. 35, No. 4, Article 58, Jul. 2016, pp. 58:1-58:14.

Hanrahan et al., "Reflection from Layered Surfaces due to Subsurface Scattering", Annual Conference Series, 1993, pp. 165-174.

Jakob et al., "A Comprehensive Framework for Rendering Layered Materials", ACM Transactions on Graphics, DOI: http://dx.doi.org/10.1145/2601097.2601139, vol. 33, No. 4, Article 118, Jul. 2014, pp. 118:1-118:14.

Kahn, H., "Stochastic (Monte Carlo) Attenuation Analysis", 1949, 24 pages.

Kulla et al., "Revisiting Physically Based Shading at Imageworks", SIGGRAPH, https:// blog.selfshadow.com/publications/s2017-shading-course/, Physically Based Shading, 2017, 136 pages.

Lee et al., "Practical Multiple Scattering for Rough Surfaces", https://doi.org/10.1145/3272127.3275016, ACM Transactions on Graphics, vol. 37, No. 6, Article 275, Nov. 2018, pp. 275:1-275:12.

Meador et al., "Two-stream Approximations to Radiative Transfer in Planetary Atmospheres: A unified description of Existing Methods and A New Improvement", Journal of the Atmospheric Sciences, vol. 37, Mar. 1980, pp. 630-643.

Papas et al., "Supplemental Material: A Physically-Based BSDF for Modeling the Appearance of Paper", Eurographics Symposium on Rendering, vol. 33, No. 4, 2014, 6 pages.

Pharr et al., "Monte Carlo Evaluation Of Non-Linear Scattering Equations For Subsurface Reflection", Annual Conference Series, DOI: 10/c475r2, Jul. 2000, 10 pages.

Plass et al., "Monte Carlo Calculations of Light Scattering from Clouds", Applied Optics, vol. 7, No. 3, Mar. 1968, pp. 415-419.

Sears, V. F., "Slow-Neutron Multiple Scattering", Advances in Physics, DOI:10.1080/00018737500101361, vol. 24, No. 1, 1975, 46 pages.

Stam, Jos, "An Illumination Model for a Skin Layer Bounded by Rough Surfaces", Rendering Techniques, 2001, 2 pages.

Turquin, Emmanuel, "Practical Multiple Scattering Compensation for Microfacet Models", Tech. rep., 2019, 5 pages.

Veach et al., "Optimally Combining Sampling Techniques for Monte Carlo Rendering", Annual Conference Series, vol. 29, Aug. 1995, pp. 419-428.

Wang et al., "Position-free Multiple-bounce Computations for Smith Microfacet BSDFs", arXiv:2109.14398, vol. 1, No. 1, Sep. 2021, 12 pages.

Wang et al., "SpongeCake: A Layered Microflake Surface Appearance Model", arXiv:2110.07145, vol. 1, No. 1, Oct. 14, 2021, 15 pages.

Walter et al., "Microfacet Models for Refraction through Rough Surfaces", Eurographics Symposium on Rendering, 2007, 13 pages.

Weidlich et al., "Arbitrarily Layered Micro-Facet Surfaces", Dec. 1-4, 2007, pp. 171-178.

Xie et al., "Multiple Scattering from Distributions of Specular V-Grooves", ACM Transactions on Graphics, https://doi.org/10.1145/3272127.3275078, vol. 37, No. 6, Article 276, Nov. 2018, pp. 276:1-276:14.

Xia et al., "Gaussian Product Sampling for Rendering Layered Materials", Computer Graphics, DOI:10.1111/cgf.13883, vol. 39, No. 1, 2020, pp. 420-435.

Goertzel, G., "A Proposed Particle Attenuation Problem", Tech. rep. AECD-2808, Feb. 22, 1950, 41 pages.

Pharr et al., "Physically Based Rendering: From Theory to Implementation", 3rd Edition, 2016, 1270 pages.

* cited by examiner

TECHNIQUES FOR RENDERING MEDIA USING POSITION-FREE PATH INTEGRALS

CROSS-REFERENCE TO RELATED APPLICATIONS

This application claims the priority benefit of United States provisional patent application titled "Position-Free Path Integrals for Homogeneous Slabs and Multiple Scattering on Smith Microfacets," filed on Apr. 25, 2022, and having Ser. No. 63/334,607. The subject matter of this related application is hereby incorporated herein by reference.

BACKGROUND

Technical Field

Embodiments of the present disclosure relate generally to computer science and computer graphics and, more specifically, to techniques for rendering media using position-free path integrals.

Description of the Related Art

In three-dimensional (3D) computer graphics, a microfacet surface is a surface of a medium that includes microscopic irregularities, such as microscopic bumps. Examples of media that are modeled as having microfacet surfaces include, without limitation, metals, glass, and plastics.

One conventional approach for rendering an image of a medium that includes a microfacet surface applies the Smith microfacet model to compute reflections from the microfacet surface. One drawback of such an approach to rendering an image of a medium that includes a microfacet surface is that only one reflection at a time can be computed from the microfacet surface, even though light should be able to bounce off a portion (e.g., a bump) of the microfacet surface, hit another portion (e.g., another bump) of the microfacet surface, etc., until the light scatters. As a result, the microfacet surface can appear unnaturally dark in the rendered image.

Another conventional approach for rendering an image of a medium that includes a microfacet surface is to perform a Monte Carlo simulation of multiple paths of light rays that pass through the medium and/or scatter on the microfacet surface. Typically, the path of each light ray is simulated as a random walk, in which a random distance and a random direction are sampled, the light ray is moved through the medium by the random distance and in the random direction, and then these steps are repeated over and over until the light ray exits the medium. One drawback of using Monte Carlo simulation to render an image of a medium that includes a microfacet surface is that the rendered image oftentimes includes noise due to the random manner in which the paths of light rays through the medium are simulated. Such noise can significantly reduce the overall quality of the rendered images.

As the foregoing illustrates, what is needed in the art are more effective techniques for rendering media having microfacet surfaces in computer graphics applications.

SUMMARY

One embodiment of the present disclosure sets forth a computer-implemented method for rendering one or more graphics images. The method includes sampling one or more directions of light passing through a medium. The method also includes computing one or more parameters associated with one or more position distributions based on the one or more directions of light. The method further includes computing a brightness in a direction at which the light exits the medium based on the one or more parameters associated with the one or more position distributions and the direction at which the light exits the medium. In addition, the method includes rendering the one or more graphics images based on the brightness in the direction at which the light exits the medium.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that, given the same amount of computational resources, the disclosed techniques can be used to render images of media, including media having microfacet surfaces and homogeneous media, that include less noise than images rendered using conventional techniques. In addition, microfacet surfaces do not appear unnaturally dark in images rendered via the disclosed techniques. As a result, images rendered via the disclosed techniques have improved overall quality relative to what can be achieved using conventional rendering techniques. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
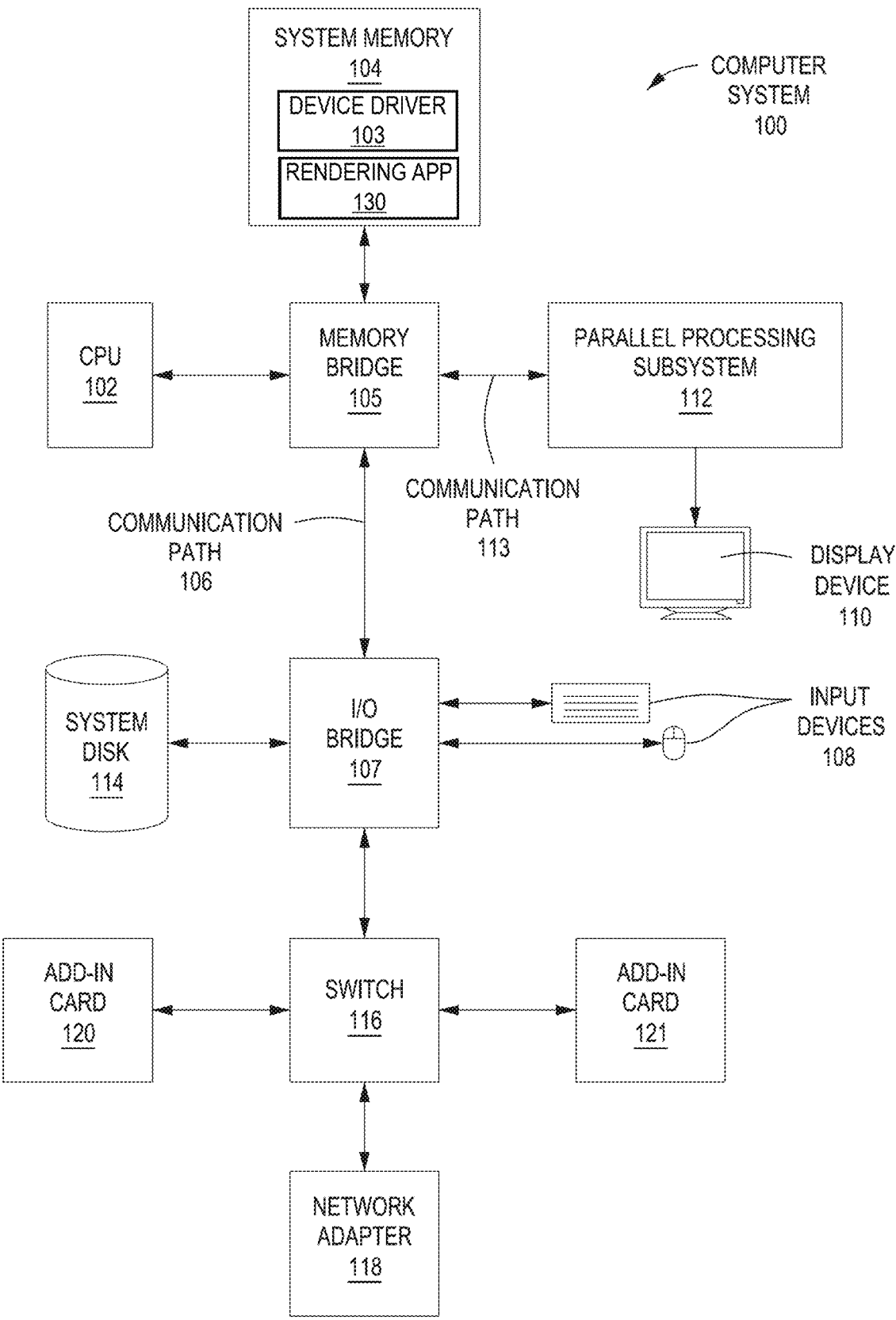
FIG. 1 is a block diagram illustrating a computer system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved techniques for rendering media, such as media having microfacet surfaces and homogeneous slabs. The improved techniques for rendering media have many real-world applications, including video games, film production rendering, and any other applications in which images including the media can be rendered. In the improved techniques, reflections from media, such as media having microfacet surfaces or homogeneous slabs, are computed using position-free path integrals. To simulate a light path through a medium, a rendering application repeatedly (1) samples a random direction, and (2) computes parameters of a position distribution based on whether the random direction is an upward or a downward direction, until the light exits the medium. The rendering application computes the brightness of a reflection in a direction that the light exits the medium based on the parameters of the position distributions and whether the light exits the medium in an upward or downward direction. Then, the rendering application computes the color of a pixel in an image being rendered based on the brightness of the reflection in the direction that the light exits the medium and a color of the medium.

The techniques for rendering media of the present disclosure have many real-world applications. For example, the techniques for rendering media can be used to efficiently render images and/or frames within a video game. As a particular example, the techniques for rendering media could be performed by a cloud-based graphics processing platform, such as a cloud-based gaming platform, that executes video games and streams videos of game sessions to client devices. Given the same amount of computing time, the disclosed techniques for rendering media can render images and/or frames that appear more realistic, with less noise than images and/or frames rendered using conventional rendering techniques.

As another example, the techniques for rendering media can be used in the production-quality rendering of films. The production of animated films as well computer-generated imagery (CGI) and special effects within live action films, often requires high-quality rendering of frames of those films. Given the same amount of computing time, the disclosed techniques for rendering media can be used to render the frames of a film with less noise than conventional rendering techniques.

The above examples are not in any way intended to be limiting. As persons skilled in the art will appreciate, as a general matter, the techniques for rendering media described herein can be implemented in any application where conventional techniques for rendering media are currently employed.

System Overview

FIG. 1 is a block diagram illustrating a computer system 100 configured to implement one or more aspects of various embodiments. As persons skilled in the art will appreciate, computer system 100 can be any type of technically feasible computer system, including, without limitation, a server machine, a server platform, a desktop machine, laptop machine, a hand-held/mobile device, or a wearable device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130. The rendering application 130 can be any technically-feasible application that renders virtual 3D scenes, and rendering the scenes can include rendering media according to techniques disclosed herein. For example, the rendering application 130 could be a gaming application or a rendering application that is used in film production. Although described herein primarily with respect to the rendering application 130, in some embodiments, the techniques for rendering media that are disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in some embodiments. For example, the parallel processing subsystem 112 could be implemented as a virtual graphics processing unit (GPU) that renders graphics on a virtual machine (VM) executing on a server machine whose GPU and other physical resources are shared across multiple VMs.

Figure 2:
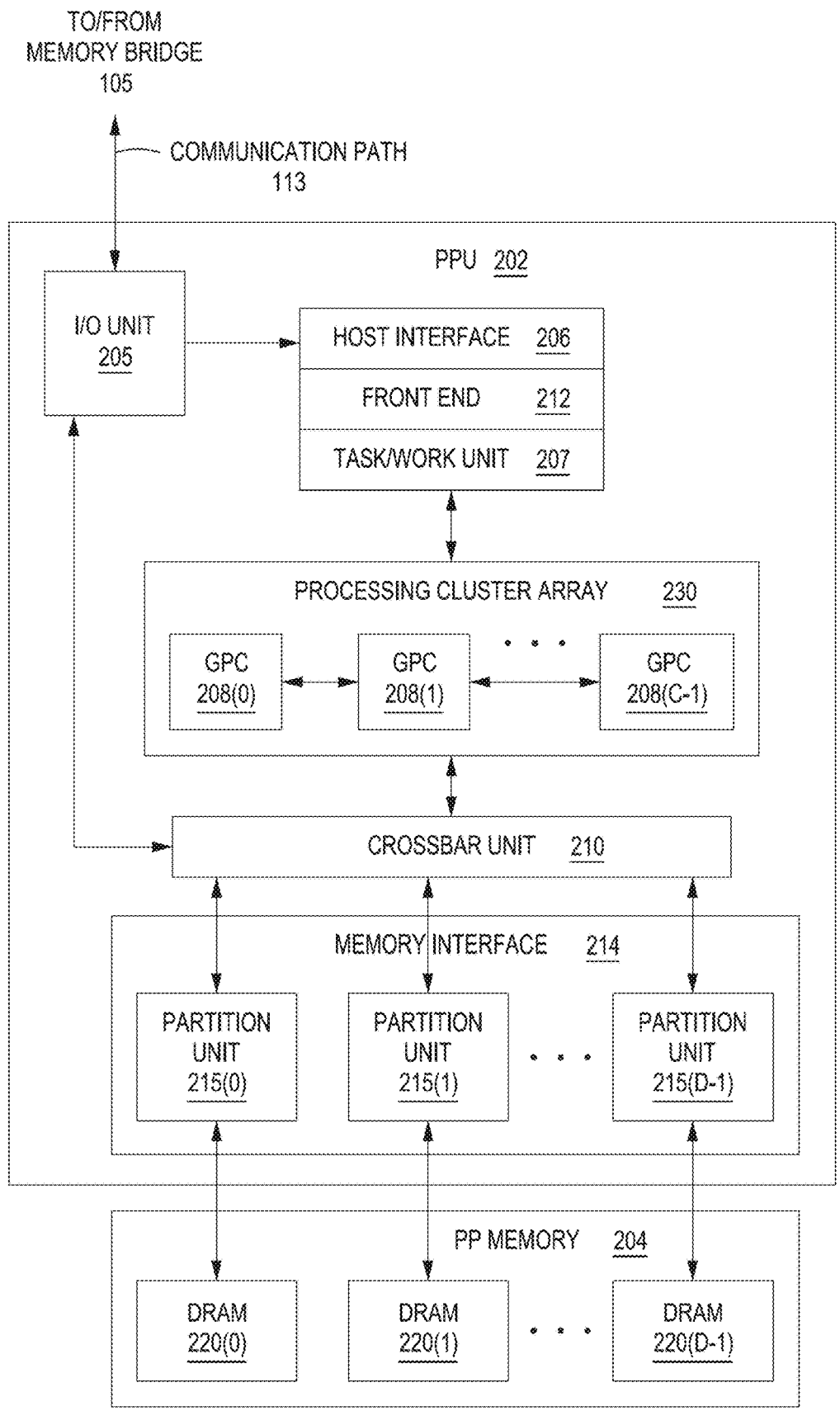
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
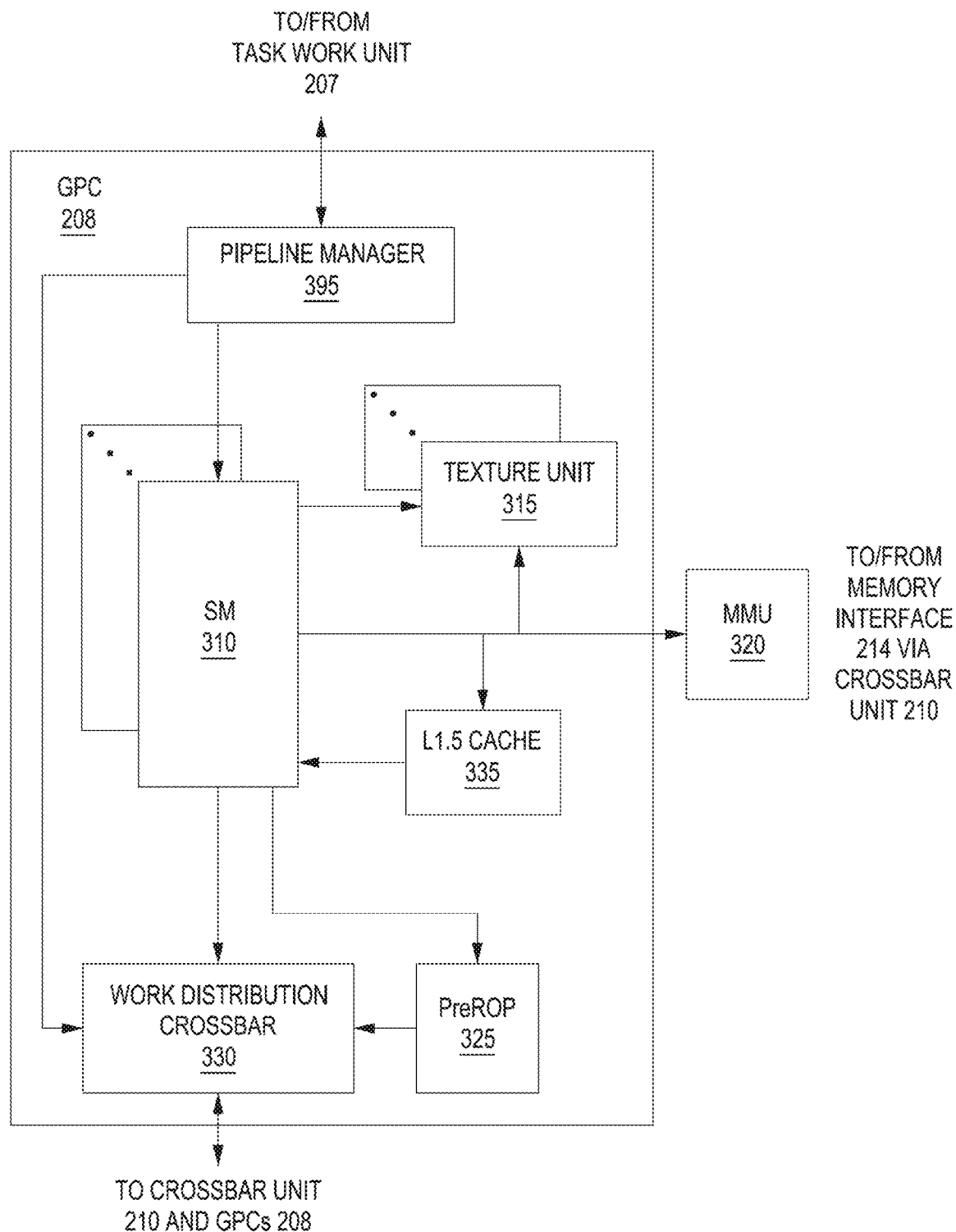
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD)

instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Figure 4:
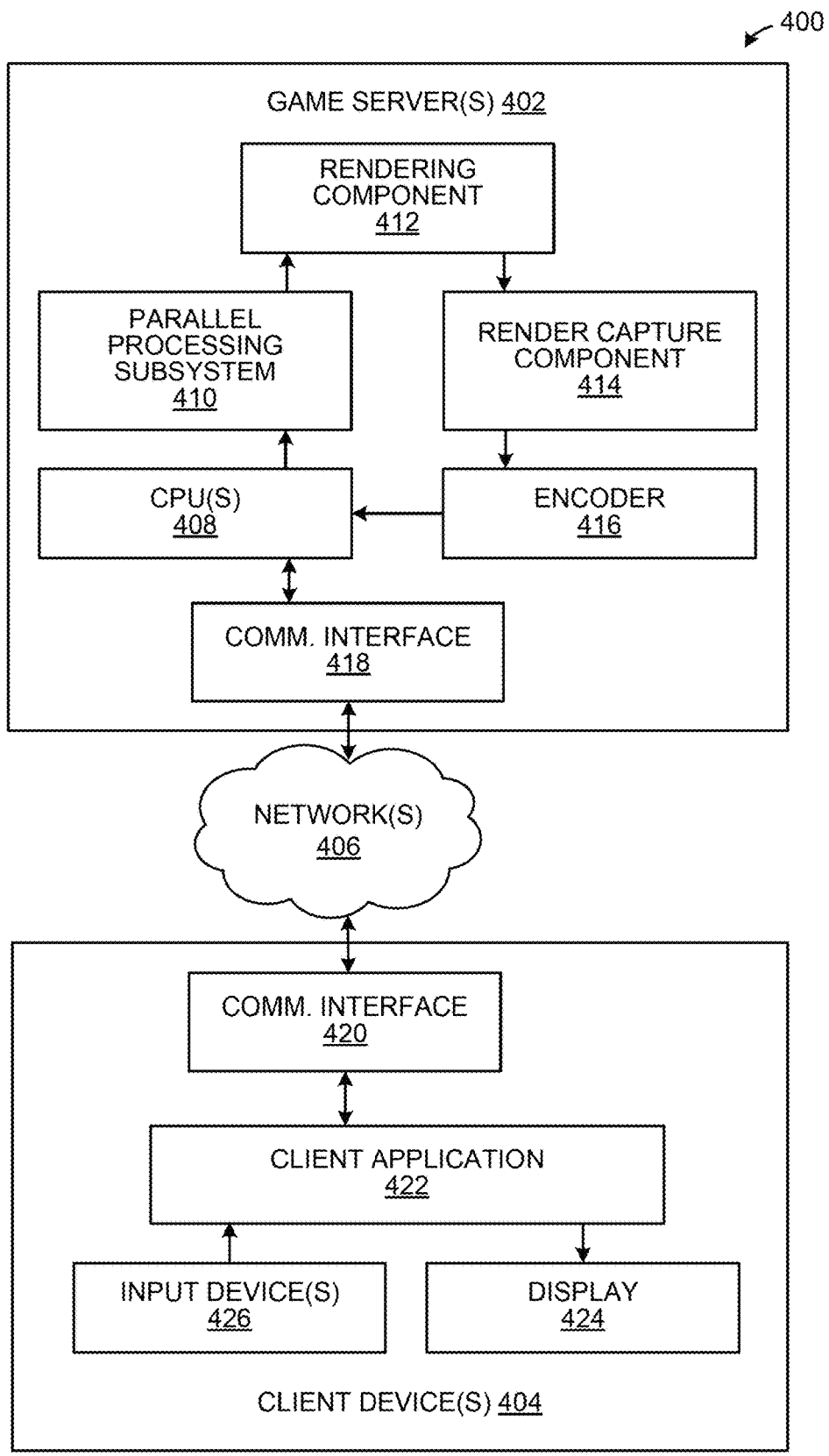
FIG. 4 is a block diagram illustrating an exemplary cloud computing system, according to various embodiments.

FIG. 4 is a block diagram illustrating an exemplary cloud computing system, according to various embodiments. As shown, a computing system 400 includes server(s) 402 that are in communication with client device(s) 404 via network(s) 406. Each of the server(s) 402 may include similar components, features, and/or functionality as the exemplary computer system 100, described above in conjunction with FIG. 1-3. Each of the server(s) 402 may be any technically feasible type of computer system, including, without limitation, a server machine or a server platform. Each of the client devices(s) 402 may also include similar components, features, and/or functionality as the computer system 100, except each client device 402 executes a client application 422 rather than the rendering application 130. Each of the client device(s) 402 may be any technically feasible type of computer system including, without limitation, a desktop machine, a laptop machine, a hand-held/mobile device, and/or a wearable device. In some embodiments, one or more of the server(s) 402 and/or the client device(s) 404 may be replaced with virtualized processing environment(s), such as virtualized processing environment(s) provided by one or more VMs and/or containers that execute on underlying hardware system(s). The network(s) 406 may include any type of network(s), such as one or more local area networks (LANs) and/or wide area networks (WANs) (e.g., the Internet).

In some embodiments, the server(s) 400 may be included in a cloud computing system, such a public cloud, a private cloud, or a hybrid cloud, and/or in a distributed system. For example, the server(s) 400 could implement a cloud-based gaming platform that provides a game streaming service, also sometimes referred to as "cloud gaming," "gaming on demand," or "gaming-as-a-service." In such a case, games that are stored and executed on the server(s) 400 are streamed as videos to the client device(s) 402 via client application(s) 422 running thereon. During game sessions, the client application(s) 422 handle user inputs and transmit those inputs to the server(s) 400 for in-game execution. Although cloud-based gaming platforms are described herein as a reference example, persons skilled in the art will appreciate that, as a general matter, the server(s) 400 may execute any technically feasible types of application(s), such as the design applications described above.

As shown, each of the client device(s) 404 includes input device(s) 426, the client application 422, a communication interface 420, and a display 424. The input device(s) 426 may include any type of device(s) for receiving user input, such as a keyboard, a mouse, a joystick, and/or a game controller. The client application 422 receives input data in response to user inputs at the input device(s) 426, transmits the input data to one of the server(s) 402 via the communication interface 420 (e.g., a network interface controller) and over the network(s) 406 (e.g., the Internet), receives encoded display data from the server 402, and decodes and causes the display data to be displayed on the display 424 (e.g., a cathode ray tube, liquid crystal display, light-emitting diode display, or the like). As such, more computationally intense computing and processing can be offloaded to the server(s) 402. For example, a game session could be streamed to the client device(s) 404 from the server(s) 402, thereby reducing the requirements of the client device(s) 404 for graphics processing and rendering.

As shown, each of the server(s) 402 includes a communication interface 418, CPU(s) 408, a parallel processing subsystem 410, a rendering component 412, a render capture component 414, and an encoder 416. Input data transmitted by the client device 404 to one of the server(s) 402 is received via the communication interface 418 (e.g., a network interface controller) and processed via the CPU(s) 408 and/or the parallel processing subsystem 410 included in that server 402, which correspond to the CPU 102 and the parallel processing subsystem 112, respectively, of the computer system 100 described above in conjunction with FIGS. 1-3. In some embodiments, the CPU(s) 408 may receive the input data, process the input data, and transmit data to the parallel processing subsystem 410. In turn, the parallel processing subsystem 410 renders one or more standalone images and/or image frames, such as the frames of a video game, based on the transmitted data.

Illustratively, the rendering component 412 employs the parallel processing subsystem 112 to render the result of processing the input data, and the render capture component 414 captures the rendering as display data (e.g., as image data capturing standalone image(s) and/or image frame(s)). The rendering performed by the rendering component 412 may include ray- or path-traced lighting and/or shadow effects, computed using one or more parallel processing units—such as GPUs, which may further employ the use of one or more dedicated hardware accelerators or processing cores to perform ray or path-tracing techniques—of the server 402. In some embodiments, the rendering component 412 performs rendering using the techniques for rendering microfacet surfaces and homogeneous slabs disclosed herein. Thereafter, the encoder 416 encodes display data capturing the rendering to generate encoded display data that is transmitted, over the network(s) 406 via the communication interface 418, to the client device(s) 422 for display to user(s). In some embodiments, the rendering component 412, the render capture component 414, and the encoder 416 may be included in the rendering application 130, described above in conjunction with FIG. 1.

Returning to the example of cloud gaming, during a game session, input data that is received by one of the server(s) 402 may be representative of movement of a character of the user in a game, firing a weapon, reloading, passing a ball, turning a vehicle, etc. In such a case, the rendering component 412 may generate a rendering of the game session that is representative of the result of the input data, and the render capture component 414 may capture the rendering of the game session as display data (e.g., as image data capturing rendered frames of the game session). Parallel processing (e.g., GPU) resources may be dedicated to each game session, or resource scheduling techniques may be employed to share parallel processing resources across multiple game sessions. In addition, the game session may be rendered using the techniques for rendering microfacet surfaces and homogeneous slabs disclosed herein. The rendered game session may then be encoded, by the encoder 416, to generate encoded display data that is transmitted over the network(s) 406 to one of the client device(s) 404 for decoding and output via the display 424 of that client device 404.

It will be appreciated that the architecture described herein is illustrative and that variations and modifications are possible. Among other things, any number of processing units, such as the SMs 310, texture units 315, or preROP units 325, described above in conjunction with FIG. 3, may be included within GPC 208.

Rendering Slab Media

Figure 5:
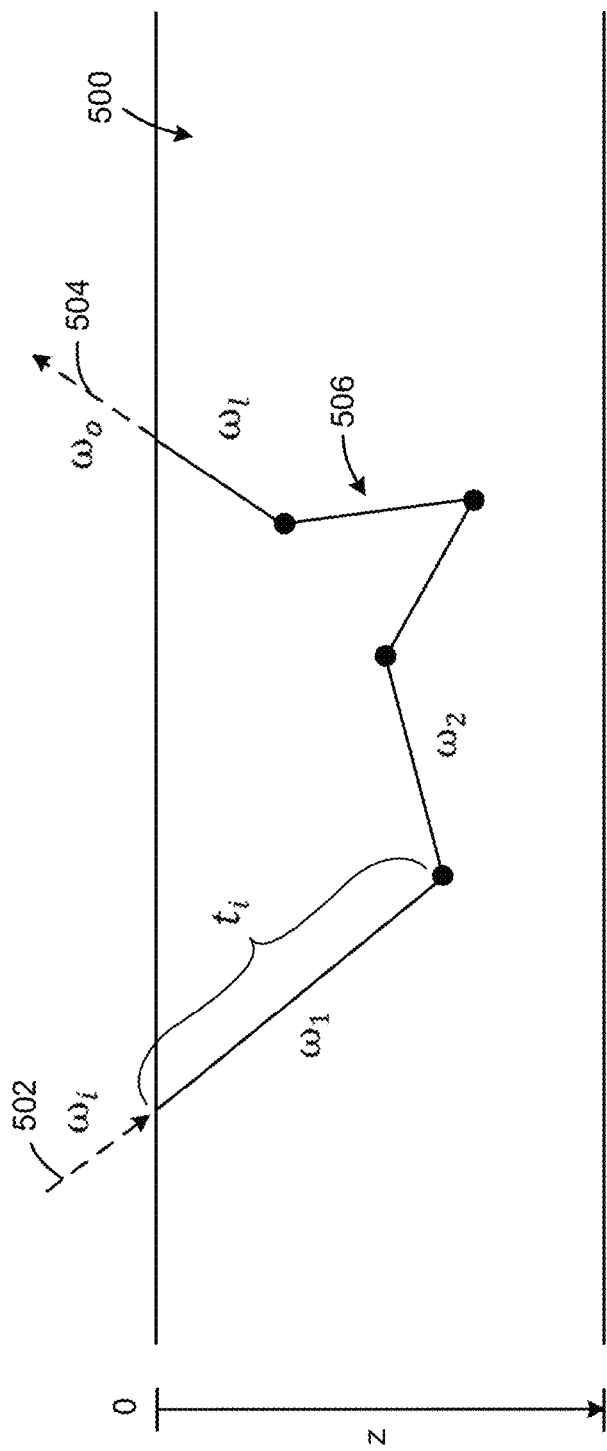
FIG. 5 illustrates light transport through a medium, according to various embodiments.

FIG. 5 illustrates light transport through a medium, according to various embodiments. As shown, given a direction 502, denoted by $\omega_i$, at which incoming light enters a medium 500, the problem of light transport requires determining a reflection in the form of outgoing light that exits the medium 500 in another direction 504, denoted by $\omega_o$. The reflection can be caused by multiple paths of light through the medium 500 that enter in the direction $\omega_i$ and exit in the direction $\omega_o$. An example light path 506 is shown for illustrative purposes. As shown, the light path 506 has length l=5. Illustratively, incoming light enters the medium 500 from direction $\omega_1=w_i$ and travels distance $t_1$ before scattering into direction $\omega_2$. This process repeats until the path length l is reached, at which point the light leaves the medium 500 in the direction $\omega_o$. The foregoing example assumes that light enters the medium 500 from the top at z=0. If not, the directions $\omega_i$ and $\omega_o$ can be negated.

More formally, the quantity of interest for light transport is the bidirectional scattering distribution function (BSDF) for a medium, which takes the incoming and outgoing directions of light as inputs and outputs the brightness of a reflection in the outgoing direction. The BSDF follows from integrating over all possible paths inside the medium that connect the incoming and outgoing directions, regardless of lateral displacement.

In general, a homogeneous scattering medium in a slab of infinite x-y extent occupies the z-span [0, L], where the z axis points down into the slab. It is assumed the medium is index-matched, i.e., no refraction occurs after light enters the slab. The medium is associated with a phase function $\rho(\omega, \omega')$ that describes the density with which photons traveling in direction w scatter toward direction $\omega'$ after a collision within the medium. The phase function may integrate to less than one in some cases to account for absorption of photons by the medium. In addition, the medium can have a homogeneous extinction coefficient, $\sigma$, which gives rise to the transmittance $$Tr(t,\sigma)=e^{-t\sigma} \qquad (1)$$

and the free-flight probability distribution function (PDF)

$$p(t,\sigma)=\sigma e^{-t\sigma}. \qquad (2)$$

For the example light path 506, the light enters the medium 500 from the direction $\omega_1=\omega_i$ and travels a distance $t_1$ with a probability given by the PDF $p(t_1, \sigma)$ before scattering into direction $\omega_2$, and this process continues until length l, at which point the light leaves the slab in the direction $w_f=\omega_0$.

As described, the problem of determining the density of photons that enter a slab from direction $w_i$ and exit the slab in direction $\omega_o$ can be formulated as the integral over all possible paths a photon could take through the slab. Mathematically, the total contribution of all paths of length l is $$I_l = \int_\mathcal{P} (\Pi_{i=1}^{l-1} \rho(\Phi_i, \omega_{i+1}))(\Pi_{i=1}^{l-1} p(t_i, \sigma)) \, Tr(t_l, \sigma) d\mu(\bar{t}, \bar{\omega}), \qquad (3)$$

where $\mathcal{P}$ is the space of paths that lie within the slab, and $d\mu(\bar{t}, \bar{\omega}))=d\mu(\bar{t}) \times d\mu(\bar{\omega})$ is the product of standard Lebesgue measures of distances $\bar{t}=t_1 \ldots t_l$ and solid angle measures of directions $\bar{\omega}=\omega_1 \ldots \omega_l$. The integral over all possible paths is the sum $\Sigma_{l=2}^{\infty} I_l$ over all path lengths. It should be noted the integrand in equation (3) includes three components: the directional density $\Pi\rho(\omega_i, \omega_{i+1})$ of the path; the free-flight density $\Pi\rho(t_i, \sigma)$ of the travel distances $t_1 \ldots t_{l-1}$; and the probability $Tr(t_l)$ of the photon exiting the slab from the last path vertex. In addition, the directions $\omega_1=w_i$, $\omega_f=\omega_o$ and the distance $t_l$ are not free variables; the latter of which is determined by the distance of the last path vertex to the boundary of the medium.

A medium having a microfacet surface can be expressed equivalently as a homogeneous slab. This is because on microfacet surfaces and in homogeneous slabs, the average distance to the next collision follows a distribution, and the properties of the slab can be chosen so that the distributions match. In some embodiments, the BSDF for a medium, such as a medium having a microfacet surface or a homogeneous slab, can be computed using position-free path integrals, as discussed in greater detail below in conjunction with FIGS. 6-9.

Figure 6:
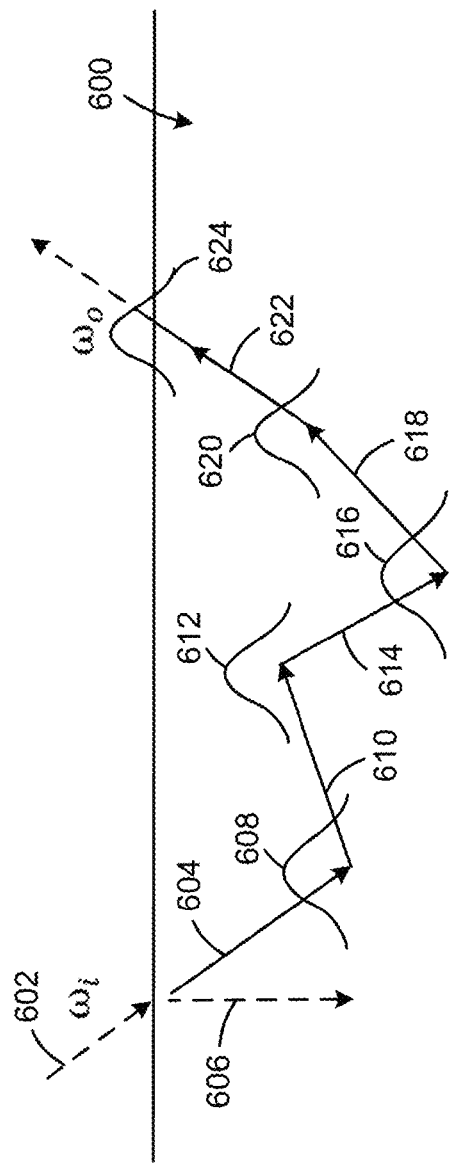
FIG. 6 illustrates an approach for computing light transport through a medium using a position-free path integral, according to various embodiments.

FIG. 6 illustrates an approach for computing light transport through a medium using a position-free path integral, according to various embodiments. As shown, in order to simulate a light path through a medium 600 from a given direction 602 at which light enters the medium 600 to another direction 626 that the light exits the medium 600, the rendering application 130 repeatedly (1) samples a random direction, and (2) computes parameters of a position distribution based on whether the random direction is an upward or a downward direction, until the light exits the medium 600. Doing so analytically integrates all position-related quantities of the light transport problem. In particular, the probability of exiting the medium 600 is separated from other terms in the path integral, and the light transport problem is reduced to manipulating the distribution of positions in a simplified one-dimensional (1D) medium. In some embodiments, each position distribution is a distribution of heights indicating a probability of a photon of light traveling to different heights within the medium 600. Such a position distribution is akin to the result of simulating infinitely many random walks of a light ray. In some embodiments, computing the parameters of each position distribution includes computing coefficients of the position distribution, discussed in greater detail below. In particular, each position distribution can be reduced to a simple sum of exponentials, the coefficients of which can be computed with iterative rules.

Illustratively, directions 604, 610, 614, 618, and 622 have been randomly sampled during five time steps. The direction 604 is a downward direction because a z (i.e., vertical) component 606 of the direction 604 is negative. Similarly, the direction 614 is a downward direction, and the directions 610, 618, and 622 are upward directions. Depending on whether each direction 604, 610, 614, 618, and 622 is upward or downward, the rendering application 130 performs a different computation to obtain parameters of a corresponding distribution of positions 608, 612, 616, 620, and 626, as discussed in greater detail below. The rendering application 130 computes the brightness of a reflection in the direction that the light exits the medium 600 based on the parameters of the position distributions 608, 612, 616, 620, and 626 and whether the light exits the medium in an upward or downward direction. It should be understood that the light can only exit the medium in the downward direction if the medium is transparent (e.g., glass). For media that are not transparent, light will always reflect back up and exit in the upward direction. Then, the rendering application 130 computes the color of a pixel in an image being rendered based on the brightness of the reflection and a color of the medium 600.

More formally, the integration problem of the BSDF, described above in conjunction with FIG. 5, can be simplified as follows in order to compute the parameters of position distributions (e.g., the position distributions 608, 612, 616, 620, and 626) for each randomly sampled direction (e.g., directions 604, 610, 614, 618, and 622) during the simulation of a light path through a medium. It can be shown that all distance dimensions $t_i$ in equation (3) can be integrated analytically. Notably, the directional terms in equation (3) do not depend on distances, so part of the integration of equation (3) can be moved inside:

$$I_l = \int_\Omega (\Pi_{i=2}^{l-1} \rho(\omega_i, \omega_{i+1})) \int_\mathcal{T} (\Pi_{i=1}^{l-1} p(t_i, \sigma)) \, Tr(t_l) d\mu(\bar{t}) d\mu(\bar{\omega}), \qquad (4)$$

where $\Omega$ and $\mathcal{T}$ are spaces of directions and distances, respectively (with $\mathcal{P}=\Omega \times \mathcal{T}$). The inner integration is the probability $P_{exit}(\omega_0, \ldots, \omega_l)$ of a photon exiting the slab, conditioned on the directions the photon takes after each collision. The following shows how the probability $P_{exit}$ can be derived in closed form.

First, a change in variables can be performed from the distance $t_i$ a photon travels to the (absolute) height difference between collisions $\Delta z_i = t_i \cdot |(\omega_i)_z|$, where $(\omega)_z$ refers to the z-component of vector $\omega$. Such a change of variables gives the relation $$p(t_i, \sigma)dt_i = \frac{1}{|(\omega_i)_z|} p\left(\frac{\Delta z_i}{|(\omega_i)_z|}, \sigma\right) d\Delta z_i \qquad (5)$$

$$= p(\Delta z_i, \sigma_i) d\Delta z_i$$

with $\sigma_i = \frac{\sigma}{|(\omega_i)_z|}$, $\qquad (6)$ and similarly $$Tr(t_i, \sigma) = Tr(\Delta z_i, \sigma_i). \qquad (7)$$

Equations (5)-(7) imply that collisions in a three-dimensional (3D) slab are equivalent to collisions in a "densified" 1D medium in which the extinction coefficient increases as photon directions become less vertical. Such a formulation allows for integrating explicitly over the depths of collisions, rather than the distances traveled between collisions. In particular, with the projection to 1D, the problem of computing $P_{exit}$ can be reformulated as a simpler problem: given a height distribution $h_{l-1}(z)$, which represents the probability density that a photon will collide at height z after traveling l–1 distances in the medium, the exit probability of the photon can be expressed as $$P_{exit}(\omega_1, \ldots, l) = \begin{cases} P_{exit}^\uparrow = \int_0^L h_{l-1}(z) Tr(z, \sigma_l) dz & \text{if } (\omega_l)_z < 0 \\ P_{exit}^\downarrow = \int_0^L h_{l-1}(z) Tr(L-z, \sigma_l) dz & \text{else} \end{cases} \qquad (8)$$

Equation (8) is simply the PDF of colliding at z after l–1 propagations, multiplied by the probability of exiting the slab from z. z=0 when the photon exits from a top interface of the slab, and z=L when the photon exits from a bottom interface of the slab.

The following is a derivation of the height distribution, described above, which can be represented in closed form as a hyper-exponential distribution (a sum of exponentials). Notably, given such a height distribution, the exit probability of equation (8) can be computed in closed form.

The straightforward case of $h_1(z)$, which is the probability density of a photon colliding at z after propagating once in a medium, is equivalent to the free-flight PDF $$h_1(z) = p(z, \sigma_1). \qquad (9)$$

The more complicated distribution after traveling i distances can be written recursively in terms of the density $h_{i-1}$ and depends on the direction of travel since the last collision: if the photon is moving down into the lab, then a collision density of the photon is equivalent to the density of colliding at a point y<z above z, and then colliding again at z:

$$h_i^\downarrow(z) = \int_0^z h_{i-1}(y) p(z-y, \sigma_i) dy. \qquad (10)$$

If the photon is moving upward, then a collision density of the photon is equivalent to colliding at some point y>z below z:

$$h_i^\uparrow(z) = \int_z^L h_{i-1}(y) p(y-z, \sigma_i) dy. \qquad (11)$$

The height distributions of equations (10)-(11) can be solved in closed form. In particular, $h_i(z)$ is a sum of exponentials, $$h_i(z) = \sum_{j=1}^{N_i} a_{i,j} Tr(z, b_{i,j}) \qquad (12)$$

for some $N_i$, $a_{i,j}$, $b_{i,j}$. The proof follows by induction. The base case is trivial, with $h_1(z) = p(z, \sigma_1)$ and $N_1 = 1$, $a_{1,1} = b_{1,1} = \sigma_1$. For the induction step, the two cases of the photon moving up or down can be shown as follows. For the "down" case, the height distribution can be expanded as follows:

$$h_{i+1}^\downarrow(z) = \int_0^z h_i(y) p(z-y, \sigma_{i+1}) dy \qquad (13)$$

$$= \sum_{j=1}^{N_i} a_{i,j} \int_0^z Tr(y, b_{i,j}) p(z-y, \sigma_{i+1}) dy \qquad (14)$$

$$= \sum_{j=1}^{N_i} a_{i,j} \frac{\sigma_{i+1}}{\sigma_{i+1} - b_{i,j}} \left( e^{-zb_{i,j}} - e^{-z\sigma_{i+1}} \right) \qquad (15)$$

$$= \left( \sum_{j=1}^{N_i} \frac{a_{i,j} \sigma_{i+1}}{\sigma_{i+1} - b_{i,j}} Tr(z, b_{i,j}) \right) - \left( \sum_{j=1}^{N_i} \frac{a_{i,j} \sigma_{i+1}}{\sigma_{i+1} - b_{i,j}} \right) Tr(z, \sigma_{i+1}) \qquad (16)$$

$$= \sum_{j=1}^{N_i+1} a_{i+1,j} Tr(z, b_{i+1,j})$$

If the height distribution is a sum of exponentials, then the height distribution remains a sum of exponentials after the photon travels an additional (downward) segment. The coefficients of the new distribution are $$a_{i+1,j}^\downarrow = \begin{cases} a_{i,j} \frac{\sigma_{i+1}}{\sigma_{i+1} - b_{i,j}} & \text{if } j < N_{i+1} \\ \sum_{j=1}^{N_i} -a_{i+1,j} & \text{else} \end{cases} \qquad (17)$$

$$b_{i+1,j}^\downarrow = \begin{cases} b_{i,j} & \text{if } j < N_{i+1} \\ \sigma_{i+1} & \text{else} \end{cases} \text{ and } N_{i+1}^\downarrow = N_i + 1$$

The "up" case is very similar to the down case, and the height distribution for the up case remains a sum of exponentials, with coefficients $$a_{i+1,j}^\uparrow = \begin{cases} a_{i,j} \frac{\sigma_{i+1}}{\sigma_{i+1} + b_{i,j}} & \text{if } j < N_{i+1} \\ \sum_{j=1}^{N_i} -a_{i+1,j} Tr(L, \sigma_{i+1} + b_{i,j}) & \text{else} \end{cases} \qquad (18)$$

$$b_{i+1,j}^\uparrow = \begin{cases} b_{i,j} & \text{if } j < N_{i+1} \\ -\sigma_{i+1} & \text{else} \end{cases} \text{ and } N_{i+1}^\uparrow = N_i + 1.$$

Given the height distributions from equations (13)-(18), the exit probability can be derived by inserting equation (12) into equation (8), which produces an exit probability that reduces to a simple sum of transmittances:

$$P_{exit}^\uparrow(\omega_0, \ldots, \omega_l) = \sum_{j=1}^{N_l} \frac{a_{i,j}}{\sigma_l + b_{i,j}} (1 - Tr(L, \sigma_l + b_{i,j})) \qquad (19)$$

$$P_{exit}^\downarrow(\omega_0, \ldots, \omega_l) = \sum_{j=1}^{N_l} \frac{a_{i,j}}{\sigma_l - b_{i,j}} (Tr(L, b_{i,j}) - Tr(L, \sigma_l)). \qquad (20)$$

In addition, a useful special case arises for a semi-infinite slab, i.e., L→∞. In such a case, the "up" case simplifies to $$N_{i+1}^{\uparrow} = N_i, \ b_{i+1,j}^{\uparrow} = b_{i,j} \text{ and } a_{i+1,j}^{\uparrow} = a_{i,j} \frac{\sigma_{i+1}}{b_{i,j} + \sigma_{i+1}}, \quad (21)$$

where the number of exponentials stays unchanged, and only the amplitude of the existing exponentials is rescaled. The "down" case remains identical to the finite slab. The exit probabilities simplify as well, with $$P_{exit}^{\uparrow}(\omega_1, \ldots, \omega_l) = \sum_{j=1}^{N_l} \frac{a_{i,j}}{b_{i,j} + \sigma_l} \quad (22)$$

$$P_{exit}^{\uparrow}(\omega_1, \ldots, \omega_l) = 0. \quad (23)$$

In some embodiments, given the above simplification of the integration problem of the BSDF, the reflectance in the direction that light exits the medium 600 can be computed according to the pseudocode of Algorithms 1 and 2. Algorithm 1 samples a set of directions $\omega_1, \ldots, \omega_l$ and calls the functions in Algorithm 2 to compute the height distribution $h_l$. The coefficients of the height distribution are initialized with the base case, and the update rules of equations (17) or (18) are run for each direction in the set of directions, depending on whether the direction is upward or downward. The exit probability $P_{exit}$ is then computed with equation (19) or (20), depending on whether the exit direction is upward or downward, to obtain the reflection from the medium. The pseudocode for computing $h_l$ and $P_{exit}$ in Algorithm 2 requires storing up to 2l coefficients, $a_{i,j}$ and $b_{i,j}$, and requires $O(l^2)$ total operations. For the semi-infinite case, the operations involve simple arithmetic. For the finite slab case, exponentials are evaluated as well.

Algorithm 1: Position-free estimation of reflectance from a slab.

```
function positionFreeSlab(l, ωᵢ, ωₒ, L)
    HeightDistribution h
    ω = ωᵢ
    result ← 0
    for i ← 1 ... l − 1 do
        h.addBounce(ω, σ(ω), L)
        result ← result + ρ(ω, ωₒ) · h.P_exit(ωₒ, σ(ωₒ), L)
        ω ← scatter(ω)
    return result
```

Algorithm 2: Implementation of the closed-form height distribution and computation of $P_{exit}$.

```
class HeightDistributiondef N, a[ ], b[ ]function addBounce(ω, σ, L)
class HeightDistributiondef N, a[ ], b[ ]function addBounce(ω, σ, L)
    class HeightDistributiondef N, a[ ], b[ ]function
        addBounce(ω, σ, L)
            if N = 0 then // Base case
                a[1] ← σ
                b[1] ← σ
            else if (ω)_z < 0 then // "Up" case, equation (18)
                for i ← 1 ... N do
```

$$a[i] \leftarrow a[i] \frac{\sigma}{\sigma + b[i]}$$

```
                a[N + 1] ← Σ_{i=1}^N −a[i]Tr(L, σ + b[i])
                b[N + 1] ← −σ
            else // "Down" case, equation (17)
                for i ← 1 ... N do
```

$$a[i] \leftarrow a[i] \frac{\sigma}{\sigma - b[i]}$$

```
                a[N + 1] ← Σ_{i=1}^N −a[i]
                b[N + 1] ← σ
            N ← N + 1
    function P_exit(ω, σ, L)
        if (ω)_z < 0 then // "Up" case
```

$$\text{return } \sum_{i=1}^{N_i} \frac{a[i]}{\sigma + b[i]} (1 - Tr(L, \sigma + b[i])) \text{ // Equation (19)}$$

```
        else // "Down" case
```

$$\text{return } \sum_{i=1}^{N_i} \frac{a[i]}{\sigma - b[i]} (Tr(L, b[i]) - Tr(L, \sigma)) \text{ // Equation (20)}$$

Although described above primarily with respect to an index-matched slab for simplicity, techniques disclosed herein can also be applied to render non-index matched media. Given incoming and outgoing directions $\omega_i$ and $\omega_o$, respectively, for a non-index matched medium, the refractive boundaries of such a medium can be handled by computing refracted directions $w'_i$ and $w'_o$, and using the refracted directions to compute the height distribution $h_l$ and the exit probability $P_{exit}$.

Figure 7A:
FIG. 7A illustrates an exemplar rendered image of media that include microfacet surfaces, according to the prior art.
Figure 7A:
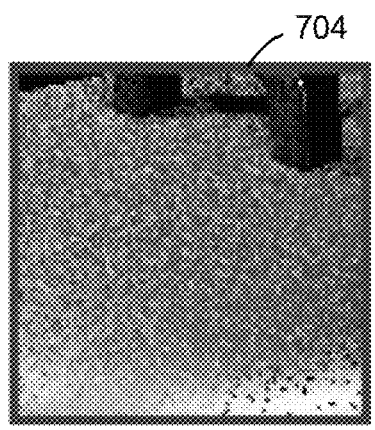

FIG. 7A illustrates an exemplar rendered image of media that include microfacet surfaces, according to the prior art. As shown, an image 700 of pots on a stove, which are made of conductors having microfacet surfaces, has been rendered under direct lighting according to conventional techniques. In particular, the image 700 has been rendered via Monte Carlo simulation of light paths through, among other things, the media of the pots and the stove for 108 milliseconds. Also shown is a zoomed-in view 704 of a portion 702 of the image 700. Illustratively, the image 700 includes a significant amount of noise due to the random manner in which light paths through media are simulated to render the image 700.

Figure 7B:
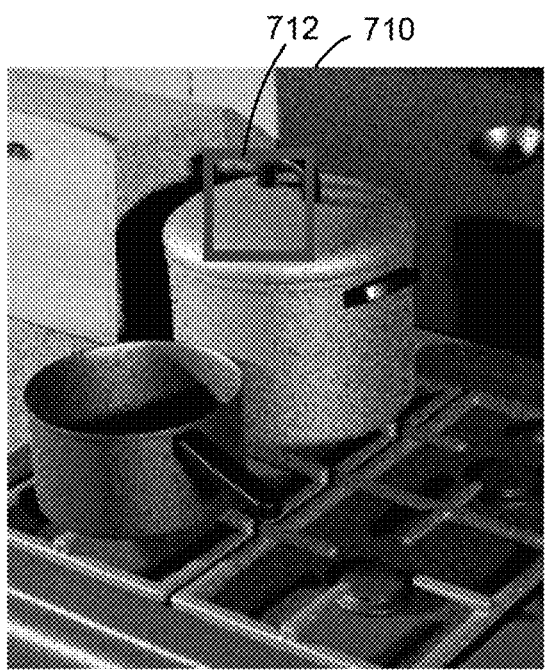
FIG. 7B illustrates an exemplar rendered image of media that include microfacet surfaces, according to various embodiments.
Figure 7B:
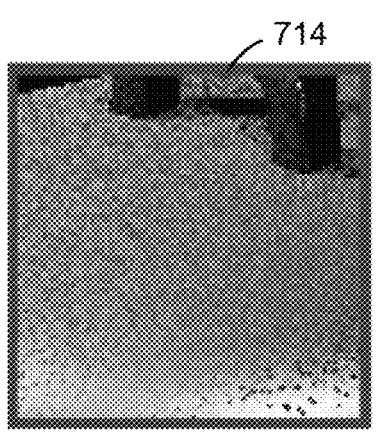

FIG. 7B illustrates an exemplar rendered image of media that include microfacet surfaces, according to various embodiments. As shown, an image 710 that includes the same pots on a stove as the image 700 has been rendered under direct lighting using the position-free path integrals disclosed herein for 110 milliseconds. To render the image 710, the 1D extinction coefficient $$\sigma(\omega) = \begin{cases} \Lambda(\omega) & \text{if } (\omega)_z < 0 \\ 1 + \Lambda(\omega) & \text{else} \end{cases} \quad (24)$$

was used. Inserting equation (24) into Algorithm 1 leads to a position-free estimator of multiple scattering on microfacet surfaces. All microfacet surfaces in the image 710 feature multiple scattering and use the GGX distribution with varying roughnesses ($\alpha \in 0.05, 0.5$). Also shown is a zoomed-in view 714 of a portion 712 of the image 710. Illustratively, given approximately the same amount of computation time, the image 710 rendered using position-free path integrals includes less noise, and has a better overall image quality, relative to the image 700 rendered using conventional techniques. In particular, the image 710 includes reduced variance (i.e., noise) relative to the image 700, and without any bias (i.e., incorrect results). Although described with respect to conductors as an example of media that include microfacet surfaces, techniques disclosed herein can be applied to render images of other types of media that include microfacet surfaces, such as certain types of glass and plastics.

Figure 8A:
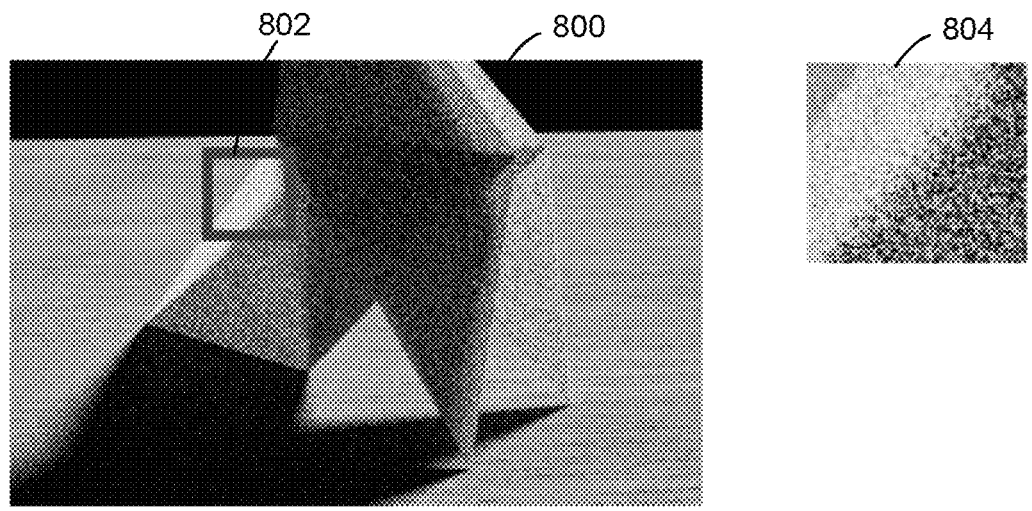
FIG. 8A illustrates an exemplar rendered image of a medium that includes a homogeneous slab, according to the prior art.

FIG. 8A illustrates an exemplar rendered image of a medium that includes a homogeneous slab, according to the prior art. As shown, an image 800 of a paper folding on a table has been rendered according to conventional techniques. In particular, the image 800 has been rendered via Monte Carlo simulation of light paths through, among other things, the media of the paper for 714 milliseconds. Also shown is a zoomed-in view 804 of a portion 802 of the image 800. Similar to the image 700, the image 800 includes a significant amount of noise due to the random manner in which light paths through media are simulated to render the image 800.

Figure 8B:
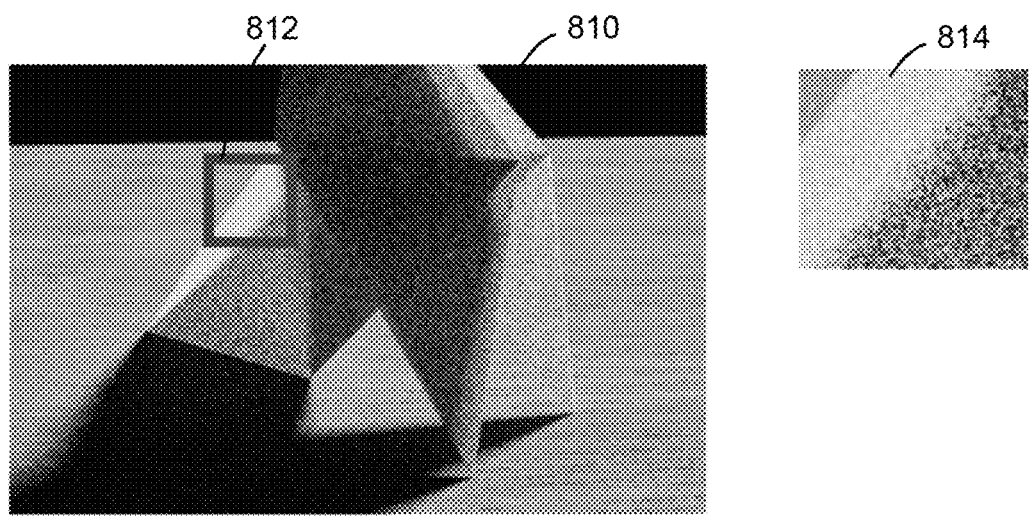
FIG. 8B illustrates an exemplar rendered image of a medium that includes a homogeneous slab, according to various embodiments.

FIG. 8B illustrates an exemplar rendered image of a medium that includes a homogeneous slab, according to various embodiments. As shown, an image 810 that includes the same paper folding on a table as the image 800 has been rendered using the position-free path integrals disclosed herein for 756 milliseconds. To render the image 810, the 1D extinction coefficient $\sigma(\omega)=\sigma \cdot |(\omega)_z|$ was used. Also shown is a zoomed-in view 814 of a portion 812 of the image 810. Illustratively, given approximately the same amount of computation time, the image 810 rendered using position-free path integrals includes less noise, and has a better overall image quality, relative to the image 800 rendered using conventional techniques. In particular, the image 810 includes reduced variance relative to the image 800, both in terms of visible noise and mean squared error (MSE). Although FIG. 8B is described with respect to paper as an example of a homogeneous medium in a slab, techniques disclosed herein can be applied to render images of other types of homogeneous slabs in some embodiments. In such cases, the homogeneous slabs can act as a component in specialized BSDFs such as the BSDFs for paper, or in more general layered material frameworks either enclosed by dielectric interfaces or in a stack of slabs with index-matched interfaces.

Figure 9:
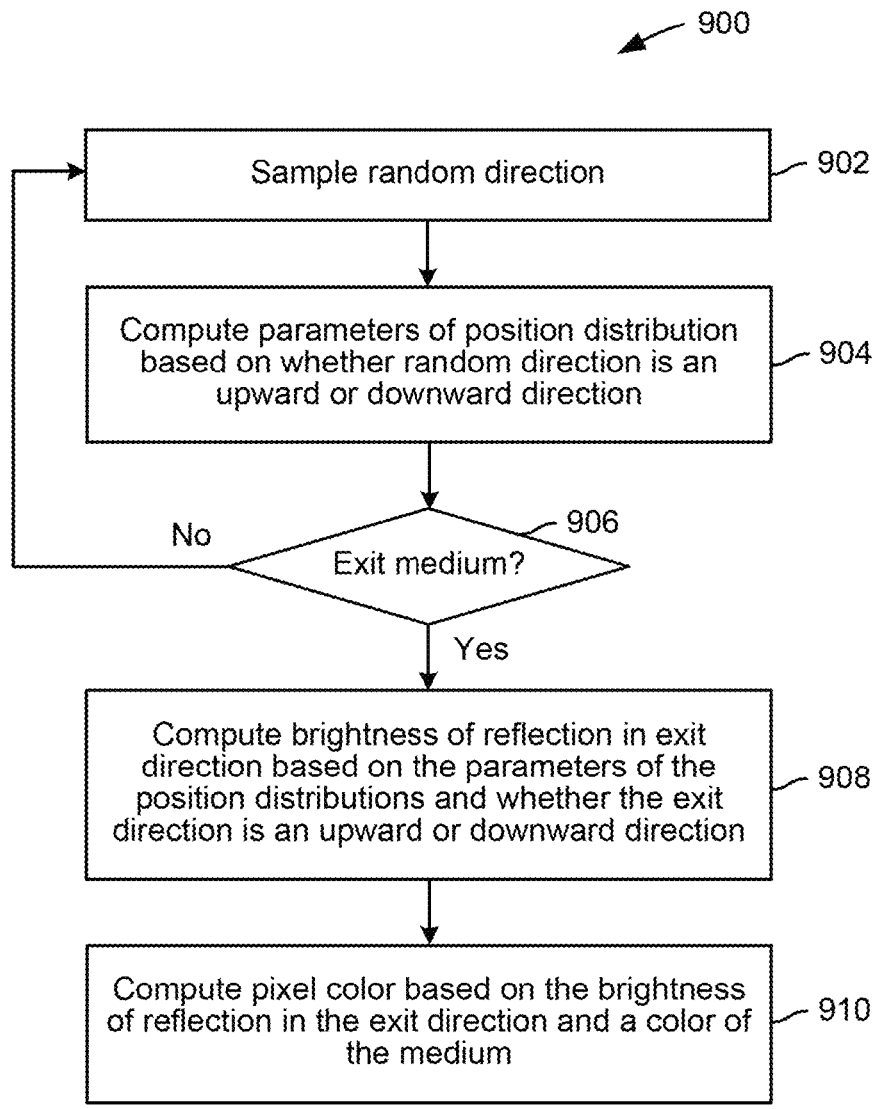
FIG. 9 is a flow diagram of method steps for computing the color of a pixel in a rendered image using a position-free path integral, according to various embodiments.

FIG. 9 is a flow diagram of method steps for computing the color of a pixel in a rendered image using a position-free path integral, according to various embodiments. Although the method steps are described in conjunction with the systems of FIGS. 1-4, persons skilled in the art will understand that any system configured to perform the method steps in any order falls within the scope of the present embodiments.

As shown, a method 900 begins at step 902, where the rendering application 130 samples a random direction for light traveling through a medium after light enters the medium. Step 902 assumes that a light ray has been traced through a graphics scene to a point at which the light ray intersects the medium.

At step 904, the rendering application 130 computes parameters of a position distribution based on whether the sampled direction at step 902 is upward or downward. As described, in some embodiments, the position distribution is a distribution of heights indicating a probability of a photon of light moving to different heights within the medium. The sampled direction is upward if a vertical (z) component of the random direction is positive, and the sampled direction is downward if the vertical component of the random direction is negative. In some embodiments, computing the parameters of the position distribution includes computing coefficients of the position distribution according to equations (17) or (18), described above in conjunction with FIG. 6, depending on whether the sampled direction is downward or upward, respectively.

At step 906, if the rendering application 130 determines that the light is not exiting the medium, then the method 900 returns to step 902, where the rendering application 130 samples another random direction of the light traveling through the medium.

On the other hand, if the rendering application 130 determines that the light is exiting the medium at step 906, then the method 900 continues to step 908, where the rendering application 130 computes the brightness of a reflection in the exit direction based on the parameters of the position distributions and whether the exit direction is up or down. In some embodiments, the brightness of the reflection can be computed according to equations (19) or (20), described above in conjunction with FIG. 6, depending on whether the exit direction is downward or upward, respectively.

At step 910, the rendering application 130 computes a pixel color based on the brightness of the reflection in the exit direction, determined at step 908, and a color of the medium. In some pixel color is also computed based on one or more properties of the medium, including the density of the medium. In some embodiments, the pixel color can be computed in the manner shown in Algorithm 1, described above in conjunction with FIG. 6. In Algorithm 1, the color of the medium is given by ρ, and the density of the material is given by the extinction coefficient σ.

Although steps of the method 900 are described above with respect to computing a single pixel color, in some embodiments, the method steps can be repeated to compute multiple pixel colors in an image that is being rendered. Additionally, in some embodiments, the rendering application 130 can perform a Russian roulette technique to terminate some low-energy light paths, for which the reflection in the exit direction is determined to have a relatively small value. In such cases, the rendering application 130 can compute after each step of the random walk, during which a random direction of light is sampled and parameters of a position distribution are computed, a maximum possible reflection in the exit direction. Then, the rendering application can randomly terminate the random walk if the maximum possible value is below a threshold value. For example, in some embodiments, the energy left within the medium can be computed from the height distribution $h_l$ and used as the termination probability after every collision. In addition, for random walks that are not terminated, the rendering application 130 can multiply the resulting reflection value by the likelihood of terminating the random walk so that, on average, the reflection values are not changed.

Although described herein primarily with respect to media having microfacet surfaces and homogeneous slabs, techniques disclosed herein can also be used to render other types of media, such as layered, index-matched slabs.

In sum, techniques are disclosed for rendering images that include media, such as media having microfacet surfaces and homogeneous slabs, using position-free path integrals. In some embodiments, to simulate a light path through a medium, a rendering application repeatedly (1) samples a random direction, and (2) computes parameters of a position distribution based on whether the random direction is an upward or a downward direction, until the light exits the medium. The rendering application computes the brightness of a reflection in the direction that the light exits the medium based on the parameters of the position distributions and whether the light exits the medium in an upward or downward direction. Then, the rendering application computes the color of a pixel in an image being rendered based on the brightness of the reflection in the direction that the light exits the medium and a color of the medium.

At least one technical advantage of the disclosed techniques relative to the prior art is that, given the same amount of computational resources, the disclosed techniques can be used to render images of media, including media having microfacet surfaces and homogeneous media, that include less noise than images rendered using conventional techniques. In addition, microfacet surfaces do not appear unnaturally dark in images rendered via the disclosed techniques. As a result, images rendered via the disclosed techniques have improved overall quality relative to what can be achieved using conventional rendering techniques. These technical advantages represent one or more technological improvements over prior art approaches.

1. In some embodiments, a computer-implemented method for rendering one or more graphics images comprises sampling one or more directions of light passing through a medium, computing one or more parameters associated with one or more position distributions based on the one or more directions of light, computing a brightness in a direction at which the light exits the medium based on the one or more parameters associated with the one or more position distributions and the direction at which the light exits the medium, and rendering the one or more graphics images based on the brightness in the direction at which the light exits the medium.

2. The computer-implemented method of clause 1, wherein computing the one or more parameters associated with the one or more position distributions comprises, for each direction included in the one or more directions, computing one or more coefficients associated with a position distribution based on whether a vertical component of the direction is positive or negative.

3. The computer-implemented method of clauses 1 or 2, wherein the brightness in the direction at which the light exits the medium is computed based on the one or more parameters associated with the one or more position distributions and whether a vertical component of the direction at which the light exits the medium is positive or negative.

4. The computer-implemented method of any of clauses 1-3, wherein the one or more position distributions include one or more distributions of heights.

5. The computer-implemented method of any of clauses 1-4, wherein the one or more directions of light are sampled at one or more time steps, and the method further comprises, at each time step included in the one or more time steps, determining whether to terminate a path of the light based on a maximum value of the brightness in the direction at which the light exits the medium.

6. The computer-implemented method of any of clauses 1-5, wherein the brightness in the direction at which the light exits the medium is further computed based on a probability that at least one light path through the medium is terminated.

7. The computer-implemented method of any of clauses 1-6, wherein the brightness in the direction at which the light exits the medium is further computed based on a density of the medium.

8. The computer-implemented method of any of clauses 1-7, wherein the computation of the brightness in the direction at which the light exits the medium approximates a path integral through the medium.

9. The computer-implemented method of any of clauses 1-8, wherein rendering the one or more graphics images comprises computing a pixel color based on the brightness in the direction at which the light exits the medium and a color associated with the medium.

10. The computer-implemented method of any of clauses 1-9, wherein the medium comprises at least one of a microfacet surface or a homogeneous slab.

11. In some embodiments, one or more non-transitory computer-readable media store program instructions that, when executed by at least one processor, cause the at least one processor to perform the steps of sampling one or more directions of light passing through a medium, computing one or more parameters associated with one or more position distributions based on the one or more directions of light, computing a brightness in a direction at which the light exits the medium based on the one or more parameters associated with the one or more position distributions and the direction at which the light exits the medium, and rendering the one or more graphics images based on the brightness in the direction at which the light exits the medium.

12. The one or more non-transitory computer-readable media of clause 11, wherein computing the one or more parameters associated with the one or more position distributions comprises, for each direction included in the one or more directions, computing one or more coefficients of a position distribution based on whether a vertical component of the direction is positive or negative.

13. The one or more non-transitory computer-readable media of clauses 11 or 12, wherein the brightness in the direction at which the light exits the medium is computed based on the one or more parameters associated with the one or more position distributions and whether a vertical component of the direction at which the light exits the medium is positive or negative.

14. The one or more non-transitory computer-readable media of any of clauses 11-13, wherein the one or more directions of light are sampled at one or more time steps, and the method further comprises, at each time step included in the one or more time steps, determining whether to terminate a path of the light based on a maximum value of the brightness in the direction at which the light exits the medium.

15. The one or more non-transitory computer-readable media of any of clauses 11-14, wherein the brightness in the direction at which the light exits the medium is further computed based on a probability that at least one light path through the medium is terminated.

16. The one or more non-transitory computer-readable media of any of clauses 11-15, wherein the brightness in the direction at which the light exits the medium is further computed based on one or more properties of the medium.

17. The one or more non-transitory computer-readable media of any of clauses 11-16, wherein the one or more position distributions include one or more distributions of heights.

18. The one or more non-transitory computer-readable media of any of clauses 11-17, wherein rendering the one or more graphics images comprises computing a pixel color based on the brightness in the direction at which the light exits the medium and a color associated with the medium.

19. The one or more non-transitory computer-readable media of any of clauses 11-18, wherein the medium comprises at least one of metal, glass, plastic, or paper.

20. In some embodiments, a system comprises one or more memories storing instructions, and one or more processors that are coupled to the one or more memories and, when executing the instructions, are configured to sample one or more directions of light passing through a medium, compute one or more parameters associated with one or more position distributions based on the one or more directions of light, compute a brightness in a direction at which the light exits the medium based on the one or more parameters associated with the one or more position distributions and the direction at which the light exits the medium, and render the one or more graphics images based on the brightness in the direction at which the light exits the medium.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering one or more graphics images, the method comprising:
    sampling a plurality of directions of light passing through a slab medium;
    computing one or more parameters associated with one or more position distributions based on the plurality of directions of light;
    computing a brightness in a direction at which the light exits a plurality of portions of a first surface of the slab medium based on the one or more parameters associated with the one or more position distributions and based on the direction at which the light exits the plurality of portions of the first surface of the slab medium; and
    rendering the one or more graphics images based on the brightness in the direction at which the light exits the plurality of portions of the first surface of the slab medium.

2. The computer-implemented method of claim 1, wherein computing the one or more parameters associated with the one or more position distributions comprises, for each direction included in the plurality of directions, computing one or more coefficients associated with a position distribution based on whether a vertical component of the direction is positive or negative.

3. The computer-implemented method of claim 1, wherein the brightness in the direction at which the light exits the plurality of portions of the first surface of the slab medium is computed based on the one or more parameters associated with the one or more position distributions and whether a vertical component of the direction at which the light exits the plurality of portions of the first surface of the slab medium is positive or negative.

4. The computer-implemented method of claim 1, wherein the one or more position distributions include one or more distributions of heights.

5. The computer-implemented method of claim 1, wherein the plurality of directions of light is sampled at one or more time steps, and the method further comprises, at each time step included in the one or more time steps, determining whether to terminate a path of the light based on a maximum value of the brightness in the direction at which the light exits the plurality of portions of the first surface of the slab medium.

6. The computer-implemented method of claim 1, wherein the brightness in the direction at which the light exits the plurality of portions of the first surface of the slab medium is further computed based on a probability that at least one light path through the slab medium is terminated.

7. The computer-implemented method of claim 1, wherein the brightness in the direction at which the light exits the plurality of portions of the first surface of the slab medium is further computed based on a density of the slab medium.

8. The computer-implemented method of claim 1, wherein the computation of the brightness in the direction at which the light exits the plurality of portions of the first surface of the slab medium approximates a path integral through the slab medium.

9. The computer-implemented method of claim 1, wherein rendering the one or more graphics images comprises computing a pixel color based on the brightness in the direction at which the light exits the plurality of portions of the first surface of the slab medium and a color associated with the slab medium.

10. The computer-implemented method of claim 1, wherein the slab medium comprises at least one of a microfacet surface or a homogeneous slab.

11. One or more non-transitory computer-readable media storing program instructions that, when executed by at least one processor, cause the at least one processor to perform the steps of:
sampling a plurality of directions of light passing through a slab medium;
computing one or more parameters associated with one or more position distributions based on the plurality of directions of light;
computing a brightness in a direction at which the light exits a plurality of portions of a first surface of the slab medium based on the one or more parameters associated with the one or more position distributions and based on the direction at which the light exits the plurality of portions of the first surface of the slab medium; and
rendering the one or more graphics images based on the brightness in the direction at which the light exits the plurality of portions of the first surface of the slab medium.

12. The one or more non-transitory computer-readable media of claim 11, wherein computing the one or more parameters associated with the one or more position distributions comprises, for each direction included in the plurality of directions, computing one or more coefficients of a position distribution based on whether a vertical component of the direction is positive or negative.

13. The one or more non-transitory computer-readable media of claim 11, wherein the brightness in the direction at which the light exits the plurality of portions of the first surface of the slab medium is computed based on the one or more parameters associated with the one or more position distributions and whether a vertical component of the direction at which the light exits the plurality of portions of the first surface of the slab medium is positive or negative.

14. The one or more non-transitory computer-readable media of claim 11, wherein the plurality of directions of light is sampled at one or more time steps, and the method further comprises, at each time step included in the one or more time steps, determining whether to terminate a path of the light based on a maximum value of the brightness in the direction at which the light exits the plurality of portions of the first surface of the slab medium.

15. The one or more non-transitory computer-readable media of claim 11, wherein the brightness in the direction at which the light exits the plurality of portions of the first surface of the slab medium is further computed based on a probability that at least one light path through the slab medium is terminated.

16. The one or more non-transitory computer-readable media of claim 11, wherein the brightness in the direction at which the light exits the plurality of portions of the first surface of the slab medium is further computed based on one or more properties of the slab medium.

17. The one or more non-transitory computer-readable media of claim 11, wherein the one or more position distributions include one or more distributions of heights.

18. The one or more non-transitory computer-readable media of claim 11, wherein rendering the one or more graphics images comprises computing a pixel color based on the brightness in the direction at which the light exits the plurality of portions of the first surface of the slab medium and a color associated with the slab medium.

19. The one or more non-transitory computer-readable media of claim 11, wherein the slab medium comprises at least one of metal, glass, plastic, or paper.

20. A system, comprising:
one or more memories storing instructions; and
one or more processors that are coupled to the one or more memories and, when executing the instructions, are configured to:
sample a plurality of directions of light passing through a slab medium,
compute one or more parameters associated with one or more position distributions based on the plurality of directions of light,
compute a brightness in a direction at which the light exits a plurality of portions of a first surface of the slab medium based on the one or more parameters associated with the one or more position distributions and based on the direction at which the light exits the plurality of portions of the first surface of the slab medium, and
render the one or more graphics images based on the brightness in the direction at which the light exits the plurality of portions of the first surface of the slab medium.

* * * * *